US008433113B2

(12) United States Patent
Jolly

(10) Patent No.: US 8,433,113 B2
(45) Date of Patent: Apr. 30, 2013

(54) AUTOMATIC RECOVERY OF THE LEFT VENTRICULAR BLOOD POOL IN CARDIAC CINE MAGNETIC RESONANCE IMAGES

(75) Inventor: Marie-Pierre Jolly, Hillsborough, NJ (US)

(73) Assignee: Siemens Aktiengesellschaft, München (DE)

( * ) Notice: Subject to any disclaimer, the term of this patent is extended or adjusted under 35 U.S.C. 154(b) by 700 days.

(21) Appl. No.: 12/398,425

(22) Filed: Mar. 5, 2009

(65) Prior Publication Data

US 2009/0232371 A1    Sep. 17, 2009

Related U.S. Application Data

(60) Provisional application No. 61/035,887, filed on Mar. 12, 2008.

(51) Int. Cl.
*G06K 9/00*    (2006.01)
(52) U.S. Cl.
USPC ........... 382/128; 382/103; 382/131; 382/132; 345/424; 600/416
(58) Field of Classification Search .................. 382/128, 382/103, 131, 132; 345/424; 600/416
See application file for complete search history.

(56) References Cited

U.S. PATENT DOCUMENTS

| 6,236,738 | B1 * | 5/2001 | Zhu et al. ...................... 382/107 |
| 7,339,585 | B2 * | 3/2008 | Verstraelen et al. .......... 345/424 |
| 7,519,220 | B2 * | 4/2009 | Aharon et al. ................ 382/173 |
| 7,715,603 | B2 * | 5/2010 | Niethammer .................. 382/128 |
| 7,715,626 | B2 * | 5/2010 | Florin et al. .................. 382/173 |
| 8,000,497 | B2 * | 8/2011 | Zhou et al. .................... 382/103 |
| 2005/0238215 | A1 * | 10/2005 | Jolly et al. ..................... 382/128 |
| 2006/0062457 | A1 * | 3/2006 | Grady ............................ 382/173 |
| 2006/0064007 | A1 * | 3/2006 | Comaniciu et al. ........... 600/416 |
| 2006/0159343 | A1 * | 7/2006 | Grady ............................ 382/180 |
| 2006/0239554 | A1 * | 10/2006 | Sun et al. ....................... 382/173 |
| 2007/0253609 | A1 * | 11/2007 | Aben ............................. 382/128 |
| 2009/0080745 | A1 * | 3/2009 | Zheng et al. .................. 382/131 |
| 2009/0279758 | A1 * | 11/2009 | Dikici et al. .................. 382/173 |

OTHER PUBLICATIONS

Mitchell, Steven C., et al., "Multistage Hybrid Active Appearance Model Matching: Segmentation of Left and Right Ventricles in Cardiac MR Images", IEEE Transactions of Medical Imaging, vol. 20, No. 5, May 2001, pp. 415-423.
Cocosco, Chris A., et al., "Automatic Image-Driven Segmentation of Cardiac Ventricles in Cine Anatomical MRI", Proc. of SPIE Applications of Digital Image Processing, vol. 5909 (2005), pp. 1-11.

(Continued)

*Primary Examiner* — Georgia Y Epps
*Assistant Examiner* — Kevin Wyatt
(74) *Attorney, Agent, or Firm* — Donald B. Paschburg; F. Chau & Associates, LLC

(57) ABSTRACT

An exemplary embodiment of the present invention includes a method of detecting a left ventricle blood pool. The method includes: localizing a region of interest (ROI) in a three-dimensional temporal (3D+T) image based on motion information of each slice of the 3D image over time, thresholding the ROI to determine pixels of the ROI that correspond to blood, extracting connected components from the determined pixels, clustering the extracted connected components into groups based on criteria that are indicative of a blood pool of a left ventricle, and selecting one of the groups as the left ventricle blood pool.

16 Claims, 5 Drawing Sheets

OTHER PUBLICATIONS

Phumeechanya Sopon, et al., Left Ventricular Segmentation Using Double Region-Based Snakes, Proc. ISBI (2007), pp. 840-843.

Grady, L. et al., "Isoperimetric Partitioning: A New Algorithm for Graph Partitioning", SIAM Journal on Scientific Computing 27 (6) (2006), pp. 1844-1866.

Lin, Xiang et al, "Automated Detection of Left Ventricles in 4D MR Images: Experience from a Large Study", Proc. MICCAI 2006, pp. 728-735.

Lorenzo-Valdes, Maria, et al., "Segmentation of 4D Cardiac MR Images Using a Probabilistic Atlas and the EM Algorithm", Medical Image Analysis 8 (2004), pp. 255-265.

Kaus, Michael R., et al., "Automated Segmentation of the Left Ventricle in Cardiac MRI", Medical Image Analysis 8 (2004), pp. 245-254.

Gering, David T., "Automatic Segmentation of Cardiac MRI", Proc. MICCAI (2003) pp. 524-532.

Otsu, Nobuyuki, "A Threshold Selection Method from Gray-Level Histograms", IEEE Trans. Systems, Man and Cybernatics 9 (1979), pp. 62-66.

Jolly, Marie-Pierre, "Automatic Segmentation of the Left Ventricle in Cardiac MR and CT Images", International Journal of Computer Vision 70(2) (2006), pp. 151-163.

\* cited by examiner

AUTOMATIC RECOVERY OF THE LEFT VENTRICULAR BLOOD POOL IN CARDIAC CINE MAGNETIC RESONANCE IMAGES

CROSS-REFERENCE TO RELATED APPLICATIONS

This application claims priority to U.S. Provisional Application No. 61/035,887, filed on Mar. 12, 2008, the disclosure of which is incorporated by reference herein.

BACKGROUND OF THE INVENTION

1. Technical Field

The present disclosure relates to medical imaging of the heart, and more particularly, to detection of the left ventricular blood pool in the heart.

2. Discussion of Related Art

Cardiovascular disease has become the largest cause of death in the modern world and is an important health concern. Imaging technologies such as magnetic resonance (MR) imaging allow physicians to non-invasively observe the behavior of the heart. Physicians are particularly interested in the left ventricle (LV) because it pumps oxygenated blood out to the rest of the body. To diagnose medical conditions, it is useful to be able to quantify the volume of blood pool of the LV over time and estimate its ejection fraction, cardiac output, peak ejection rate, filling rate, myocardial thickening, etc. These quantities can be computed once the LV is outlined in several images of the heart. Manual outlining of the LV is very cumbersome however, and many physicians can only manually outline the end-diastolic (ED) and end-systolic (ES) phases. While the ejection fraction and cardiac output can be computed from the resulting outlined LVs, they do not provide enough information to estimate peak ejection rate or filling rate.

Accordingly, it would be beneficial to be able to provide a system that automatically segments images of the heart to locate the LV. As a first step it is important to localize the LV blood pool. Then, the localized blood pool can be used to initialize more elaborate LV segmentation methods. However, it can be difficult to localize the LV blood pool because MR intensities are not consistent across acquisitions and blood pixels cannot easily be identified in the images. Further, many acquisitions cover slices beyond the LV itself to guarantee it is seen in all phases. This means that some slices can be below the apex and contain no blood pool, and some slices can be above the mitral valve and contain the left atrium blood pool.

Some researchers have constructed models to aid in LV segmentation. One conventional method uses a 4D probabilistic atlas of the heart and a 3D intensity template to register an ED frame to localize the left and right ventricles. A second conventional method uses a hybrid active shape and appearance model to locate the heart using a Hough transform. However, both of these methods are too slow for clinical practice. Further, models have difficulty capturing variability outside their training sets. For example, pathological cases that fall outside the standard set of shapes may not be recognized and appearance models may need to be re-trained for new acquisition protocols and sequences.

One conventional modeling method is fast enough for clinical practice, but still depends on a learned appearance represented by a Markov chain. Another conventional modeling method combines a statistical model with coupled mesh surfaces. However, many of the datasets tested using the statistical modeling method exhibit breathing artifacts and through-plane motion. Further, the statistical modeling method assumes that the heart is located in the center of an image, which is rarely a valid assumption.

Other conventional methods use simple image processing techniques to aid in LV segmentation. One conventional image processing method operates on the assumption that the coverage of a short-axis image stack stops at the mitral valve and does not go into the atrium. However, this assumption is not reasonable since physicians tend to increase the coverage of the image stack to correct for potential motion after the acquisition of the localized images to make sure that the LV is visible during all phases. Further, when the top slice extends into the atrium, the method can not separate the LV from the right ventricle (RV) without user intervention at the mitral valve.

Thus, there is a need for more efficient methods of automatically detecting the LV blood pool.

SUMMARY OF THE INVENTION

An exemplary embodiment of the present invention includes a method of detecting a left ventricle blood pool. The method includes: localizing a region of interest (ROI) in a three-dimensional temporal (3D+T) image based on motion information of each slice of the 3D image over time, thresholding the ROI to determine pixels of the ROI that correspond to blood, extracting connected components from the determined pixels, clustering the extracted connected components into groups based on criteria that are indicative of a blood pool of a left ventricle, and selecting one of the groups as the left ventricle blood pool.

The 3D image may be, for example, an MR image. The extracted connected components may be three (2D+T) dimensional. The identifying may include: ranking the groups in decreasing order of size, examining at least the first two group, and selecting a group from the at least two groups that has a highest confidence for indicating the left ventricle blood pool. The pixels may be indicative of blood when their intensities are above a threshold intensity. The grouping may include: associating each 2D+T connected component with a vertex in a graph and defining edges between the vertices of neighboring slices, calculating first measures for each vertex that are indicative of an LV blood pool, calculating second measures for each pair of vertices in neighboring slices that are indicative of the similarity between the connected components, and clustering the 2D connected components into the groups based on the first and second measures.

The clustering of the 2D+T connected components into the groups based on the first and second measures may include: generating a confidence value for each vertex from the first measures, defining an edge weight for each edge based on the confidence value and the second measures, and clustering the 2D connected components into the groups based on the edge weights.

The first measures may include a shrinking measure that indicates the amount that a 2D connected component contracts over time, a roundness measure that indicates an average roundness of a 2D connected component over time, a connectedness measure that indicates the degree of connectedness of a 2D connected component over time, and a concavity measure that indicates the degree of concavity of a 2D connected component over time.

The second measures include an overlap measure that indicates the degree of overlap between two 2D connected components, a distance measure that indicates the distance between centers of two 2D connected components, and a size measure that indicates a difference in size between areas of two 2D connected components. The ROI may be generated by computing the first harmonic of a Fourier transform over time for each slice of the 3D image to generate harmonic images to highlight moving areas, where the ROI includes a part of the moving areas. The generation of the ROI may include: fitting a 3D line through 2D centroids of the harmonic images to remove distant artifacts, and discarding connected components of the moving image with low confidences for indicating the heart. The confidences may be based on relative motions and relative sizes of the connected components.

An exemplary embodiment of the present invention includes a method of detecting a blood pool of a left ventricle. The method includes: thresholding a region of interest (ROI) to determine pixels of the ROI that correspond to blood, extracting connected components from the determined pixels, clustering the extracted connected components into groups based on criteria that are indicative of a blood pool of a left ventricle, and selecting one of the groups as the left ventricle blood pool.

The clustering may include: generating a first confidence value for each connected component that is indicative of a left ventricle blood pool, generating a second confidence value for pairs of the connected components that is indicative of the similarity between the connected components, and clustering the connected components into groups based on the first and second confidence values.

The first confidence value may be derived from a shrinking measure that indicates the amount that a connected component contracts, a roundness measure that indicates an average roundness of connected component, a connectedness measure that indicates the degree of connectedness of a connected component, and a concavity measure that indicates the degree of concavity of a connected component. The second confidence value may be derived from an overlap measure that indicates the degree of overlap between a pair of connected components, a distance measure that indicates the distance between centers of a pair of connected components, and a size measure that indicates a difference in size between areas of a pair of connected components.

An exemplary embodiment of the present invention includes a system for detecting a left ventricle blood pool. The system includes a localization unit, a thresholding unit, an extracting unit, and a clustering unit. The localization unit locates a region of interest (ROI) in a three-dimensional (3D) image based on motion information of each slice of a 3D image over time. The thresholding unit performs a thresholding on the ROI to determine pixels of the ROI that correspond to blood. The extracting unit extracts connected components from the determined pixels. The clustering unit divides the extracted connected components into groups based on criteria that are indicative of a blood pool of a left ventricle.

The localization unit may determine the motion information by performing a Fourier transform on each slice of the 3D image over time. The clustering unit may divide the extracted connected components into groups using isoperimetric clustering. Parameters of the isoperimetric clustering may include measures for each connected component and pairs of the connected components that are indicative of a blood pool of a left ventricle of a heart and the similarity between connected components.

An exemplary embodiment of the present invention includes a method of segmenting a region of interest (ROI) in a 3D+T image of a heart. The method includes: determining connected components in the ROI that only include blood pixels of the 3D image, clustering the connected components between slices of the ROI into groups using isoperimetric clustering, and selecting one of the groups as the left ventricle blood pool. Parameters of the isometric clustering may include an amount that each connected component shrinks over time and an average roundness of each connected component over time. The selecting one of the groups may include: ranking the groups in decreasing order of size, examining at least the first two groups, and selecting a group from the at least two groups that has a highest confidence for indicating the left ventricle blood pool.

BRIEF DESCRIPTION OF THE DRAWINGS

Exemplary embodiments of the invention can be understood in more detail from the following descriptions taken in conjunction with the accompanying drawings in which.

DETAILED DESCRIPTION OF EXEMPLARY EMBODIMENTS

In general, exemplary embodiments for systems and methods of detecting a blood pool of a left ventricle from a plurality of images will now be discussed in further detail with reference to FIGS. 1-5. This invention may, however, be embodied in different forms and should not be construed as limited to the embodiments set forth herein. Rather, these embodiments are provided so that this disclosure will be thorough and complete, and will fully convey the scope of the invention to those skilled in the art.

It is to be understood that the systems and methods described herein may be implemented in various forms of hardware, software, firmware, special purpose processors, or a combination thereof. In particular, at least a portion of the present invention may be implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures may be implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 1:
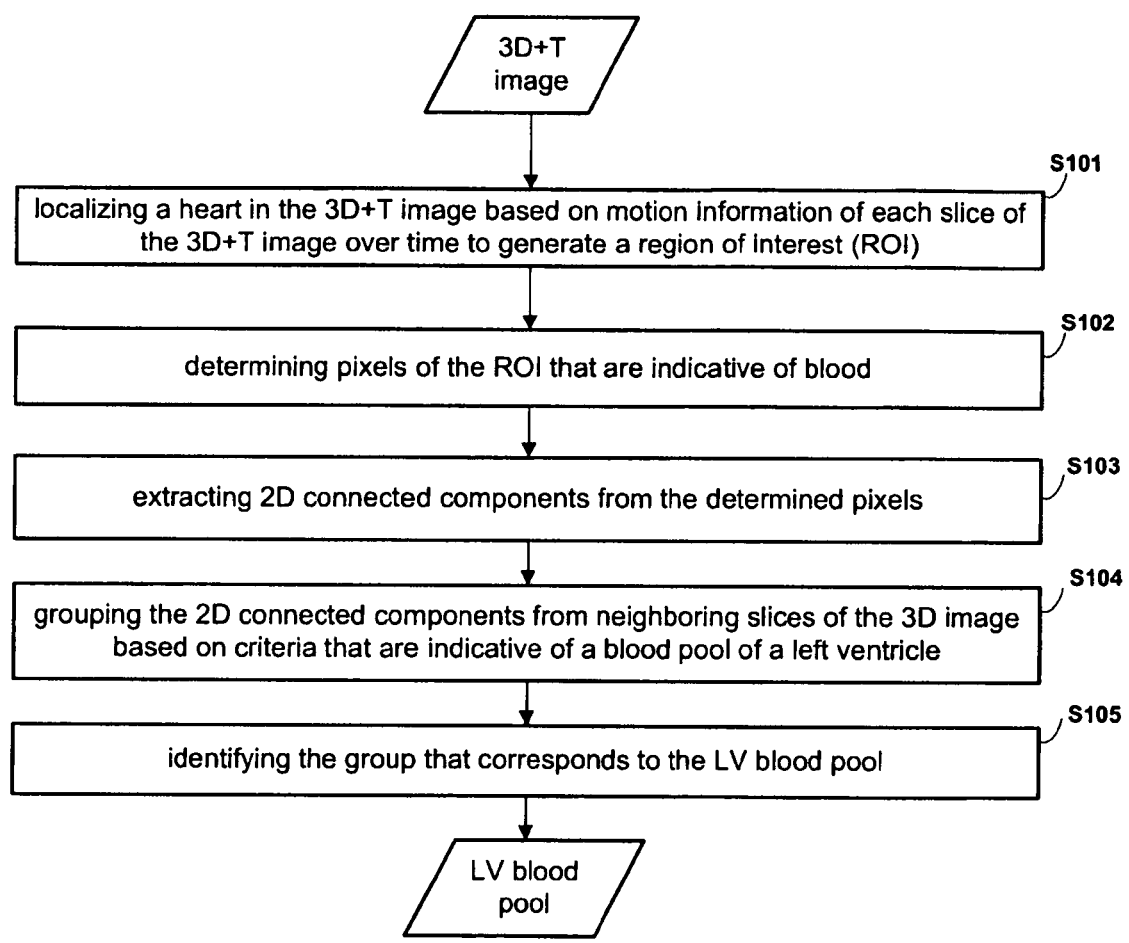
FIG. 1 illustrates a high-level flow-chart of a method of detecting a blood pool of a left ventricle, according to an exemplary embodiment of the present invention.

FIG. 1 illustrates a high-level flow chart of a method of detecting a blood pool of a left ventricle from a plurality of images, according to an exemplary embodiment of the present invention. Referring to FIG. 1, the method includes: localizing a heart in a 3D+T image based on motion information of each slice of the 3D image over time to generate a region of interest (ROI) (S101), determining pixels of the ROI that are indicative of blood (S102), extracting connected components from the determined pixels (S103), grouping the connected components from neighboring slices of the 3D image based on criteria that are indicative of a blood pool of a left ventricle (S104), and identifying the group that corresponds to the LV blood pool (S105).

Figure 2:
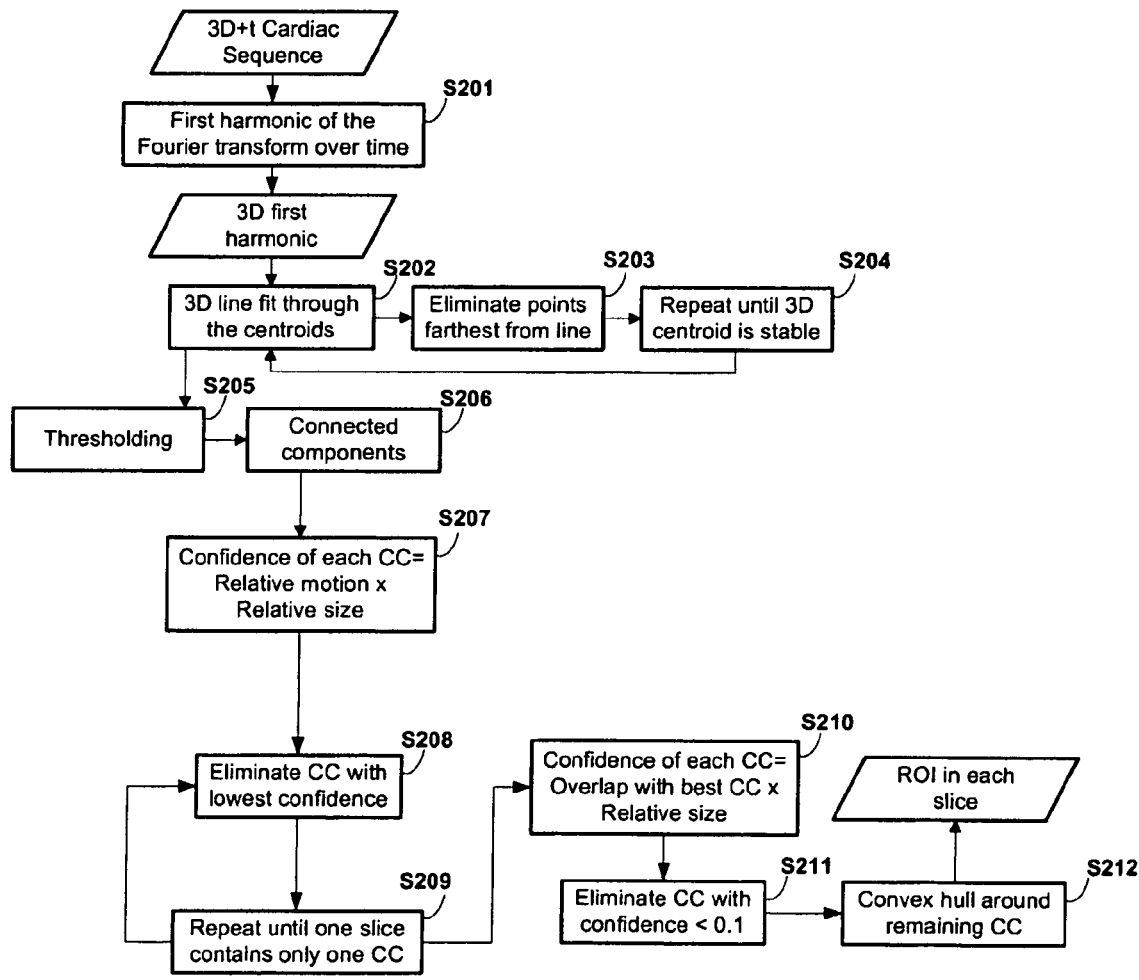
FIG. 2 illustrates a high-level flow chart of a method for locating the heart in an image, according to exemplary embodiment of the present invention.

The step (S101) of localizing the heart may be performed by the method of FIG. 2, according to an exemplary embodiment of the present invention. Referring to FIG. 2, the first harmonic of the Fourier transform over time for each slice of the 3D image is computed to generate a plurality of 3D harmonic images $H_1^s(x,y)$ (S201). The harmonic images highlight the moving structures (e.g. cardiac chamber, large vessels, etc.) within the 3D image.

Next a 3D line is fitted through the 2D centroids of the harmonic images (S202). Distances between points of the harmonic images may be weighted, histogrammed, and thresholded to remove the farthest points (S203). This procedure is repeated until the 3D centroid of the harmonic images becomes stable (S204).

Then for each slice, an average response $\overline{H_1^s}$ of the first harmonic is computed and each harmonic image is thresholded at $\overline{2H_1^s}$ to retain only the strongly moving areas (S205). Connected components (CC) are extracted and then grouped between slices to generate regions of interest that are consistent in space (S206). The CC with the largest average motion (e.g., over all pixels) is identified in each slice and the relative motion of the other CCs is computed. The CC with the largest size is identified in each slice and the relative sizes of the other CCs are computed. A confidence of a CC may then be defined as its relative size times its relative motion (S207). The CCs with the smallest confidences are removed one at a time (S208) and this process is repeated until a slice containing a single CC (denoted $\hat{C}$) is identified (S209). In the other slices, a 2D overlap between each CC and $\hat{C}$ is computed and the confidence becomes the relative size times this overlap (S210). Connected components with a confidence lower than a threshold value (e.g., 0.1) are discarded (S211). The ROI may be defined as the convex hull of the retained CCs in each of the slices (S212).

The step (S102) of determining pixels of the ROI indicative of blood may include performing a thresholding on the ROI. For example, the thresholding may be performed using Otsu's method to distinguish the bright pixels (i.e., those more likely to represent blood) from the rest. The bright pixels may also be distinguished by retaining those having intensities that are above a predefined intensity threshold and discarding the rest. The bright pixels may then be grouped into connected components.

In the step (103) of extracting the connected components, two dimensional connected components may be extracted from the ROI over time (hereinafter referred to as "2D+T connected components"). The 2D+T connected components may be extracted instead of 3D+T connected components, especially when the first slices of the datasets used contain the left atrium (LA). For example, the bright pixels of the LV would have been connected above the bright pixels of the LA, which would have been connected below to the bright pixels of the RV, and the LV and RV would have been connected. With 2D+T connected components, the LV and the RV are connected only in the mitral valve slice. The connected components are likely to include the LV blood pool, the RV blood pool, the aorta, and other noisy regions.

In the step (S104) of grouping the connected components from neighboring slices, the grouping may be performed using an isoperimetric clustering method. The isoperimetric clustering method partitions a weighted graph by minimizing the perimeter to area ratio $$\left(\text{e.g., the isoperimetric ratio } h(S) = \frac{|\partial S|}{|S|}\right).$$

A graph is a pair $G=(V, E)$ with vertices $v \in V$ and edges $e \in E \subset V \times V$. An edge between two vertices $v_i$ and $v_j$ is denoted $e_{ij}$. In one embodiment of the present invention, the largest four connected components in each slice are each associated with a vertex in the graph and edges are defined between vertices in neighboring slices. However, the present invention is not limited to the largest four connected components, as other embodiments can make use of a lesser or greater number of connected components.

The parameter $A_p(v_i)$ is used to represent the area in phase p (e.g., of the heart) of the connected component associated with a vertex $v_i$. Parameters $A^{mt}(v_i)$ and $A^M(v_i)$ are to used to respectively represent the minimum and maximum areas over time. Measures or parameters that are indicative of the characteristics of an LV blood pool may be computed for each connected component.

A shrinking measure $S(v_i)$ that indicates the amount that an object (e.g., a connected component) contracts over time may be represented by equation 1 as follows:

$$S(v_i) = \frac{A^m(v_i)}{A^M(v_i)}. \tag{1}$$

A roundness measure $R(v_i)$ indicates the degree of roundness exhibited by an object over time. The roundness measure $R(v_i)$ may be computed from the ratio of the smallest eigenvalue to the largest eigenvalue of a connected component in each phase, averaged over time. A connectedness measure $C(v_i)$ indicates the degree of connectedness exhibited by an object over time. Connected components when observed in each phase can be composed of multiple pieces. The relative size of these pieces is denoted by $r_p^j(v_i)$, $j=1, \ldots, n_i$ and the connectedness measure $C(v_i)$ may be computed by equation 2 as follows:

$$C(v_i) = \frac{1}{P}\sum_{p=1}^{P}\sum_{j=1}^{ni} r_p^j(v_i). \tag{2}$$

A concavity measure $D(v_i)$ indicates the degree of concavity exhibited by an object over time. The concavity measure $D(v_i)$ may be computed by determining the maximum distance (e.g., normalized between 0 and 1) between the object and its convex hull, averaged over time.

An overall confidence $L(v_i)$ of a connected component may be calculated using some or all of the above measures. For example, in one embodiment of the present invention, the overall confidence $L(v_i)$ is computed by equation 3 as follows:

$$L(v_i) = F_1 S(v_i)(1-R(v_i))C(v_i)^{F_2}(1-D(v_i))^{F_3}, \tag{3}$$

where factors $F_1$, $F_2$, $F_3$ may be determined empirically. In one embodiment, factor $F_1 = 1/50$ and factors $F_2$ and $F_3 = 10$. However, the present invention is not limited to these particular factors, as the factors may be adjusted in various ways. Further, the overall confidence $L(v_i)$ may be computed using a confidence equation that varies from equation 3 or by an equation that uses less than the above measures $S(v_i)$, $R(v_i)$, $C(v_i)$, and $D(v_i)$.

Edge weights, denoted $w(e_{ij})$ may indicate a similarity between vertices. The normalized area $a_p(v_i)$ of a connected component in phase p may be computed by equation 4 as follows:

$$a_p(v_i) = \frac{A_p(v_i) - A^m(v_i)}{A^M(v_i) - A^m(v_i)}. \tag{4}$$

Measures or parameters that are indicative of the characteristics of an LV blood pool may be computed for each pair of connected components in neighboring slices.

An overlap measure $O(v_i, v_j)$ indicates the degree of overlap between two 2D+T connected components. The overlap measure $O(v_i, v_j)$ may be computed by determining the intersection of the 2D+T connected components divided by their union. For example, in one exemplary embodiment, if the overlap measure $O(v_i, v_j)<0.001$, the edge $e_{ij}$ is discarded. A distance measure $D(v_i, v_j)$ indicates the distance between the centers of connected components averaged over time. A resemblance measure $T(v_i, v_j)$ indicates the resemblance of the area-time curves of a pair of connected components. The resemblance measure $T(v_i, v_j)$ may be computed using equation 5 as follows:

$$T(v_i, v_j) = \frac{1}{P}\sum_p \|a_p(v_i) - a_p(v_j)\|. \tag{5}$$

A size measure $S(v_i, v_j)$ indicates a difference in size between a pair of connected components. The size measure $S(v_i, v_j)$ may be computed using equation 6 as follows:

$$S(v_i, v_j) = \frac{1}{P}\left(\sum_p \max\left(1, \frac{A_p(v_i)}{A_p(v_j)}\right)\right), \tag{6}$$

where $v_i$ is on the slice below $v_j$. The connected components may grow smaller as one traverses down through slices closer to the apex. Thus, the size measure $S(v_i, v_j)$ may stay close to one for connected components in the LV blood pool.

An edge cost $c(v_i, v_j)$ may be computed using equation 7 as follows:

$$c(v_i, v_j) = \frac{D(v_i, v_j)T(v_i, v_j)S(v_i, v_j)}{O(v_i, v_j)}L(v_i)L(v_j). \tag{7}$$

An edge weight $w(e_{ij})$ may be computed from the edge cost $c(v_i, v_j)$. For example, the edge weight $w(e_{ij})$ may be set equal to $1/c(v_i, v_j)$.

The isoperimetric clustering method uses an indicator vector x, a perimeter, an area, and a Laplacian matrix. The indicator vector x takes a binary value at each vertex and encodes the partition S according the equation 8 as follows:

$$x_i \begin{cases} 0 & \text{if } v_i \in S, \\ 1 & \text{if } v_i \in \bar{S}. \end{cases} \tag{8}$$

The perimeter and area of the partition may be respectively defined by equations 9 and 10 as follows:

$$|\partial S| = x^T L x, \tag{9}$$

$$|S| = x^T 1, \tag{10}$$

where 1 is the unit vector and L is the Laplacian matrix, which is defined by equation 11 as follows:

$$L_{ij} = \begin{cases} d_i & \text{if } i = j, \\ -w(e_{ij}) & \text{if } e_{ij} \in E, \\ 0 & \text{otherwise, and} \end{cases} \tag{11}$$

$$d_i = \sum_{e_{ij}} w(e_{ij}).$$

The indicator vector x may be recovered by solving the linear system Lx=1, which results in a real-valued solution for x. This can be converted to a binary partition by ranking the $x_i$'s and choosing the threshold that yields the minimum value for the isoperimetric ratio h(S). The ground node may be chosen as the center of the graph (e.g., the vertex for which the shortest path to the farthest vertex the smallest, which may be recovered using Floyd Warhsall's method). This ground node may perform better to recover elongated clusters rather than the node with the largest degree. The graph is recursively partitioned until the isoperimetric ratio of the sub-partitions is larger than a stopping criteria.

A grouping obtained using the above methods is likely to provide a blood pool cluster that is reasonably large, has connected components that shrink and expand over time, is reasonably round, and contain at least one main piece in each phase. The clusters may be ranked in decreasing order of size. In one embodiment, at least two of the largest clusters are examined, as well as those as large as the first two and any cluster of size larger than three. This is merely an example, as a fewer or greater number of the ordered clusters may be examined, and the clusters may be sized larger or smaller than three. Once the clusters have been identified, a single one of the clusters $\hat{K}$ is chosen such that a function is minimized. The function may be embodied by equation 12 as follows:

$$\frac{1}{N_{\hat{K}}^2}\sum_{v_i \in k} L'(v_i) \tag{12}$$

where $N_k$ is the number of vertices in cluster K and $L'(v_i)=S(v_i)(1-R(v_i))C(v_i)^{10}$ is the confidence of a connected component. The cluster with smaller L' is the blood pool. The 2D convex hulls of the connected components in $\hat{K}$ define the left ventricle blood pool. Concavity D may be included in alternate embodiments of L'.

Figure 3:
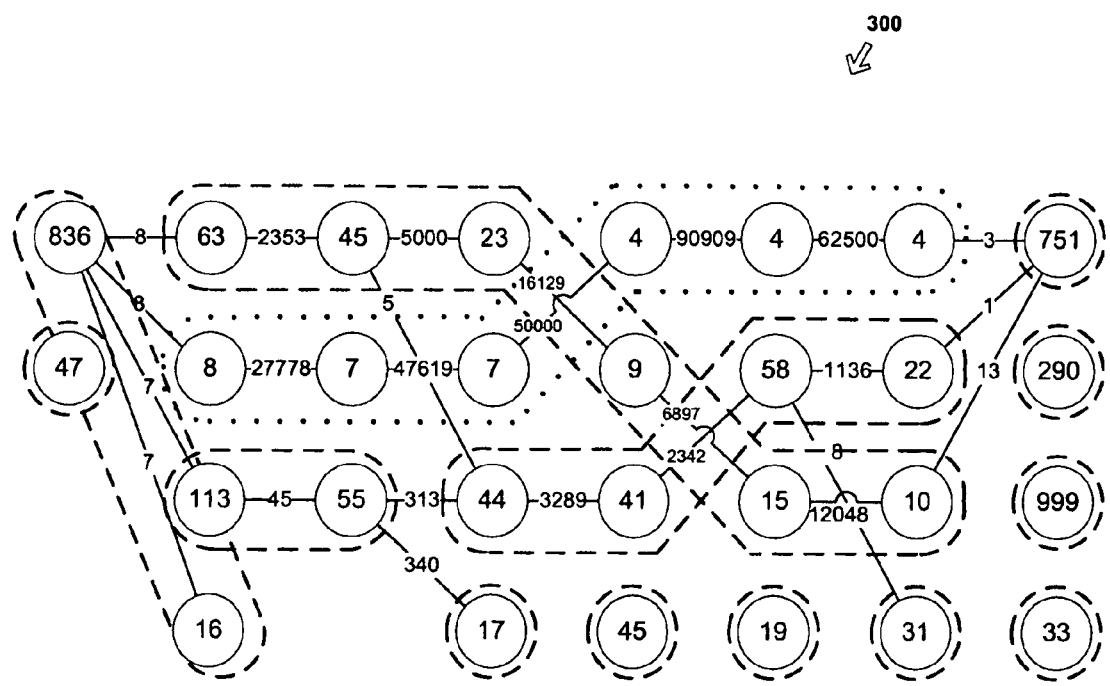
FIG. 3 illustrates an exemplary graph that may be constructed when the method of FIG. 1 is performed.

FIG. 3 illustrates an example of a graph 300 that may be constructed with edge weights $w(e_{ij})$ and confidences $L'(v_i)$ using the above described isoperimetric clustering method and the above described measures. The partitions are shown in the dashed lines and the LV blood pool partition is shown in the dotted lines. The numbers in each node (vertex) of the graph 300 are the confidences $L'(v_i)$ and the numbers on each edge between the vertices are the edge weights $w(e_{ij})$. For example, the LV blood pool is bounded by the dotted lines and includes vertices having values of 8, 7, 7, 4, 4, and 4. Each column of vertices corresponds to a different slice. The vertices within a given row of the graph 300 correspond to each of the different connected components.

Figure 4:
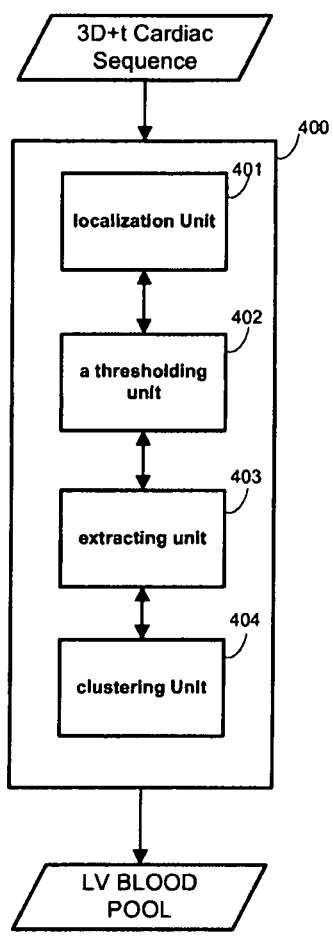
FIG. 4 illustrates a system for detecting a left ventricle blood pool, according to an exemplary embodiment of the present invention.

FIG. 4 illustrates a system 400 for detecting a left ventricle blood pool. The system includes: a localization unit 401, a thresholding unit 402, an extracting unit 403, and a clustering unit 404. The localization unit 401 is configured to locate a region of interest (ROI) in a three-dimensional (3D) image based on motion information of each slice of a 3D image over time. The thresholding unit 402 is configured to perform a thresholding on the ROI to determine pixels of the ROI that correspond to blood. The extracting unit 403 is configured to extract connected components from the determined pixels. The clustering unit 404 is configured to divide the extracted connected components into groups based on criteria that are indicative of a blood pool of a left ventricle. The localization unit 401 may determine the motion information by performing a Fourier transform on each slice of the 3D image over time. The clustering unit 404 may divide the extracted connected components into groups using isoperimetric clustering. Parameters of the isoperimetric clustering may include measures for each connected component and pairs of the connected components that are indicative of a blood pool of a left ventricle of a heart.

Figure 5:
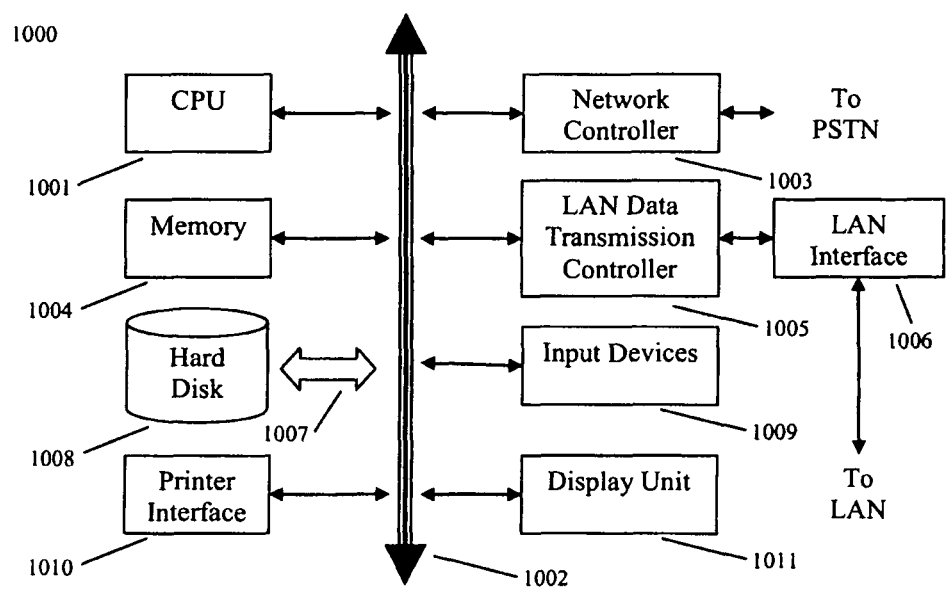
FIG. 5 shows an example of a computer system capable of implementing the methods and systems according to embodiments of the present invention.

FIG. 5 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention.

What is claimed is:

1. A method of detecting a blood pool of a left ventricle (LV) in a three-dimensional temporal (3D+T) image, the method comprising:
localizing a heart in a moving 3D image based on motion information of each slice of each 3D image of the moving 3D image over a period of time to generate a region of interest (ROI);
determining pixels of the ROI that are indicative of blood;
extracting first connected components from the determined pixels;
grouping the first connected components from neighboring slices of the 3D image based on criteria that are indicative of a blood pool of a left ventricle; and
identifying the group that corresponds to the LV blood pool wherein the localizing of the heart comprises:
identifying a single connected component from second connected components among the slices based on relative sizes and relative motions among the second connected components; and
identifying a subset of the second connected components based on the relative sizes and overlaps between the single connected component and the other second connected components.

2. The method of claim 1, wherein the connected components are two dimensional components that move over time (2D+T).

3. The method of claim 1, wherein the pixels are indicative of blood when their intensities are above a threshold intensity.

4. The method of claim 1, wherein the grouping comprises:
associating each first connected component with a vertex in a graph and defining edges between the vertices of neighboring slices;
calculating first measures for each vertex that are indicative of an LV blood pool;
calculating second measures for each pair of vertices in neighboring slices that are indicative of the similarity between the first connected components; and
clustering the first connected components into the groups based on the first and second measures.

5. The method of claim 4, wherein clustering the first connected components into the groups based on the first and second measures comprises:
generating a confidence value for each vertex from the first measures;
defining an edge weight for each edge based on the confidence value and the second measures; and
clustering the first connected components into the groups based on the confidence values and the edge weights.

6. The method of claim 5, wherein the first measures include a shrinking measure that indicates the amount that a first connected component contracts over time, a roundness measure that indicates an average roundness of a first connected component over time, a connectedness measure that indicates the degree of connectedness of a first connected component over time, and a concavity measure that indicates the degree of concavity of a first connected component over time.

7. The method of claim 5, wherein the second measures include an overlap measure that indicates the degree of overlap between a pair of the first connected components, a distance measure that indicates the distance between centers of a pair of the first connected components, and a size measure that indicates a difference in size between areas of the two first connected components.

8. The method of claim 1, wherein the ROI is generated by computing the first harmonic of a Fourier transform over time for each slice of the 3D image to generate harmonic images to highlight moving areas, wherein the ROI includes a part of the moving areas.

9. The method of claim 8, wherein the generation of the ROI includes:
fitting a 3D line through 2D centroids of the harmonic images to remove distant artifacts.

10. The method of claim 1, wherein the ROI is defined as a convex hull of the sub-set of second connected components.

11. A method of detecting a left ventricle blood pool, the method comprising:

identifying a single connected component from among a plurality of connected components based on relative sizes and relative motions among the connected components;

identifying a subset of the connected components based on the relative sizes and overlaps between the single connected component and the other connected components;

generating a region of interest (ROI) from the subset;

thresholding the ROI to determine pixels of the ROI that correspond to blood;

extracting second connected components from the determined pixels;

clustering the extracted second connected components into groups based on criteria that are indicative of a blood pool of a left ventricle; and selecting one of the groups as the left ventricle blood pool.

12. The method of claim 11, wherein the clustering comprises:

generating a first confidence value for each second connected component that is indicative of a left ventricle blood pool;

generating a second confidence value for pairs of the second connected components that is indicative of the similarity between connected components; and clustering the second connected components into groups based on the first and second confidence values.

13. The method of claim 12, wherein the first confidence value is derived from a shrinking measure that indicates the amount that a second connected component contracts, a roundness measure that indicates an average roundness of a second connected component, a connectedness measure that indicates the degree of connectedness of a second connected component, and a concavity measure that indicates the degree of concavity of a second connected component.

14. The method of claim 12, wherein the second confidence value is derived from an overlap measure that indicates the degree of overlap between a pair of the second connected components, a distance measure that indicates the distance between centers of a pair of the second connected components, and a size measure that indicates a difference in size between areas of a pair of the second connected components.

15. The method of claim 11, wherein the ROI is defined as a convex hull of the selected first connected components.

16. A program storage device readable by machine, tangibly embodying a program of instructions executable by the machine to perform method steps of segmenting a region of interest (ROI) in a 3D image of a heart the method steps comprising:

determining connected components in the ROI that only include blood pixels of the 3D image;

clustering the connected components between slices of the ROI into groups using isoperimetric clustering, wherein parameters of the isoperimetric clustering include an amount that each connected component shrinks over time and an average roundness of each connected component over time, wherein the amount corresponds to an area of the component at a first time divided by an area of the component at a second later time; and selecting one of the groups as the left ventricle blood pool.

* * * * *